(12) United States Patent
Haimovitch-Yogev et al.

(10) Patent No.: US 11,776,315 B2
(45) Date of Patent: Oct. 3, 2023

(54) APPEARANCE BASED DOMINANT EYE SELECTOR SYSTEMS AND METHODS FOR GAZE ESTIMATION FROM PASSIVE IMAGERY

(71) Applicant: BLINK TECHNOLOGIES INC., Palo Alto, CA (US)

(72) Inventors: Oren Haimovitch-Yogev, Haifa (IL); Gilad Drozdov, Haifa (IL); Igor Nor, Haifa (IL); Nadav Yehonatan Arbel, Tel Aviv (IL)

(73) Assignee: BLINK O.G. LTD., Haifa (IL)

( * ) Notice: Subject to any disclaimer, the term of this patent is extended or adjusted under 35 U.S.C. 154(b) by 201 days.

(21) Appl. No.: 17/518,656

(22) Filed: Nov. 4, 2021

(65) Prior Publication Data

US 2022/0148332 A1    May 12, 2022

Related U.S. Application Data

(60) Provisional application No. 63/109,347, filed on Nov. 4, 2020.

(51) Int. Cl.
*G06V 40/18* (2022.01)
*G06V 10/44* (2022.01)
*G06F 3/01* (2006.01)
*G06V 40/19* (2022.01)

(52) U.S. Cl.
CPC ............ *G06V 40/193* (2022.01); *G06F 3/013* (2013.01); *G06V 10/454* (2022.01); *G06V 40/19* (2022.01)

(58) Field of Classification Search
CPC .............................. G06V 10/454; G06F 3/013
See application file for complete search history.

(56) References Cited

U.S. PATENT DOCUMENTS

2020/0150759 A1\*    5/2020    Zhang .................... G06F 3/017

\* cited by examiner

*Primary Examiner* — Edward Park
(74) *Attorney, Agent, or Firm* — ALPHAPATENT ASSOCIATES, LTD; Daniel J. Swirsky

(57) ABSTRACT

The disclosure relates to systems, methods, and programs for implicitly determining the relation of the eyes associated with gaze inference, including salient features (e.g., ocular dominance) that are not visible within a digital frame, allowing for real-time determination of the user's dominant eye for the purpose of gaze estimation, and point-of-regard mapping onto a 2D plane, achieved through an end-to-end training of an eye selector agent with domain-expertise knowledge embedded in an unsupervised manner via a convolutional deep neural network training process.

16 Claims, 7 Drawing Sheets

7A Illumination difference (glasses glare)
7B Obstructed Eye
7C Eye winking
7D Eye position with respect to a camera
7E Eye disorder (e.g., amblyopia or strabismus)

APPEARANCE BASED DOMINANT EYE SELECTOR SYSTEMS AND METHODS FOR GAZE ESTIMATION FROM PASSIVE IMAGERY

RELATED APPLICATIONS

The present application claims priority to U.S. Provisional Application No. 63/109,347, filed Nov. 4, 2020, the contents of which are incorporated herein by reference.

COPYRIGHT NOTICE

A portion of the disclosure herein below contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND

The disclosure is directed to systems, methods, and programs for use in gaze estimation, eye tracking, and/or calibration for mid-range and long-range applications. More specifically, the disclosure is directed to systems, methods, and programs for developing real-time user-specific eye-selection mechanisms using unlabeled data for selecting a dominant eye to improve gaze estimation.

Eye tracking and gaze estimation can be used in a wide variety of applications from ophthalmology, assistive technologies for the disabled, through advertising, cybersecurity authentication, as well as gaming and remote panel-control. The first step in many of the tasks associated with many of the commercial gaze-estimation systems, is precisely detecting the pupil's contour and central point, glint localization, and the eyeball-center location. Typically, camera-based eye tracking approaches are divided into two stages: eye/pupil detection and gaze estimation based on that information.

Likewise, gaze estimation can be divided into two approaches: 2D appearance/feature-based analysis and 3D eye model-based analysis—usually obtained by active illumination of the eye region. Appearance/feature-based methods are typically based on the assumption that similar eye appearances/features (e.g., eye corners, elliptical or circular shape regression, etc.), correspond to similar gaze positions/directions, from which different mapping functions can be extracted to perform gaze estimation, usually by means of regression or closed-form equations. Conversely, 3D model-based methods typically perform gaze estimation based on a 3D geometric eye model, which mimics the structure and function of the human eye based on a model underpinning. Both methods require some eye-specific personalized calibration to provide reasonable accuracy. External hardware associated with eye-tracking devices also typically requires a physical screen-to-camera calibration every time the setup is assembled, which requires human intervention and technical expertise.

Physiologically, the human eye structure varies in both appearance (size of the eye and visible opening of iris and sclera) and in its internal (i.e., not visible externally) structure such as the location of the fovea and any optical limitations, disorders, or abnormalities (e.g., cataracts, amblyopia (see e.g., FIG. 7E, e.g., drooping eyelid or strabismus), astigmatism, etc.). See also, eye disorders, diseases, or other circumstances that may negatively affect the ability of the eye to be imaged or to focus on a point of regard, such as refractive errors, age-related macular degeneration, cataracts, diabetic retinopathy, glaucoma, amblyopia, nystagmus, eye prostheses, contact lenses, intraocular lenses, or strabismus.

Moreover, different individuals may have different ocular dominance—'leading-eyes' (or eyedness) mechanisms or combinations (left, right, none, or partial). The determination of the 'dominant' eye is of great importance when attempting to estimate the user point-of-regard (POR, referring to the extrapolated point in a scene the viewer is focused on).

Moreover, captured images of the eye may be asymmetrically deficient as a function of head pose in space (6-DoF), eye pose (2-DoF), illumination, eye occlusion, physical obstruction or any other obstacle which is visually visible between the image capturing device and the eye location (e.g., glasses, screens, and the like).

However, the practical utility of both these methods (appearance/feature based and model-based) or their combination is that eyes can be significantly limited due to the quality of the obtained eye-specific features, and their combination for predicting final POR. This occurs in a wide variety of systems (e.g., active IR illumination setup, stereo vision system, 3D sensors setup and the like) and sensitivity to environmental parameters such as light, distance, glare reflection (e.g., in spectacles, display screens, and windows), head pose and partial eye occlusion due external physical obstruction (see e.g., FIGS. 7B, 7C). Moreover, using current technology, unfortunately these methods: may have strong limiting assumptions, use heuristics methods to perform estimation to deal with image-based impairments (e.g., missing glint, region-of-interest, mean intensity level, etc.), are commercially unfeasible, or are insufficiently accurate.

These and other shortcomings of the existing technologies are sought to be resolved herein.

SUMMARY

Disclosed, in various exemplary implementations, are systems, methods and programs for automatically, and in real time, (1) determining a user's eye-dominance given a scenario where a person is facing a digital camera, and (2) performing a weighted combination selection of the eye (left/right) or a combination thereof to estimate the user's POR using a learning process based on physiological considerations of the human eye.

In an exemplary implementation, provided herein is a computerized method for determining a dominant eye of a user, implemented in a system comprising: an imaging module such as a camera, an eye selector module, a display, and a central processing module, the central processing module in communication with the eye-selector module, the imaging module, and the display, and in further communication with at least one processor and a non-volatile memory storage device storing thereon a processor-readable medium with a set of executable instruction, configured, when executed to cause the processor to operate the imaging module, and the display, the method comprising: using the imaging module, obtaining at least one unlabeled image of the user; isolating a frame from the unlabeled image; detecting at least one of: a face, and a head pose; extracting a portion of the frame comprising both eyes of the user, thereby extracting an eyes patch; and using the eye-selector module, determining the user's dominant eye.

In another exemplary implementation, provided herein is a computer readable medium (CRM) comprising software instructions for determining a dominant eye of a user, the instructions being operable, when executed to cause at least one processor included with a computerized system to execute the operations of: using an imaging module included with the computerized system to obtain at least one unlabeled image of the user; isolating a frame from the unlabeled image; detecting at least one of: a face, and a head pose in the frame; extracting a portion of the frame comprising both eyes of the user, thereby extracting an eyes patch; and using an eye-selector module included with the computerized system to determine the user's dominant eye.

In yet another exemplary implementation, the computerized systems used in conjunction with the methods and programs disclosed herein, further comprise at least one of: an operator interface module, face or eye detection modules, an eyes patch normalization unit, and a rendering module.

BRIEF DESCRIPTION OF THE FIGURES

For a better understanding of systems, methods, and programs for developing real-time, automatic, machine-learning based processes of left/right dominant eye selection, or the combination thereof with regard to estimation of point-of-regard (POR), and the exemplary implementations thereof, reference is made to the accompanying examples and figures, in which.

DETAILED DESCRIPTION

Provided herein are exemplary implementations of systems, methods, and programs for developing appearance-based, automatically selection of the dominant eye (left/right) or a combination of thereof, for estimation of the user's point-of-regard (PoR).

Figure 7:
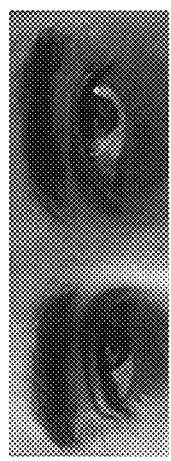
FIGS. 7A-7E are illustrations of challenging cases where the dominant eye selection systems and methods described herein are effective in determining eye dominance.
Figure 7:
Figure 7:
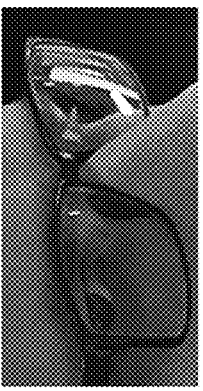
Figure 7:
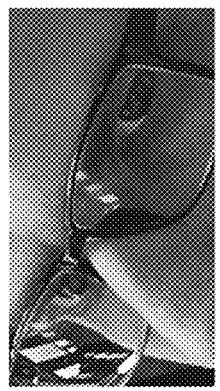
Figure 7:
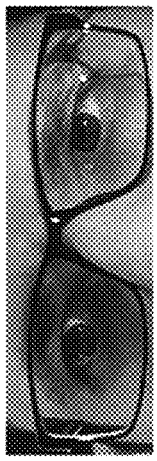
Figure 7:
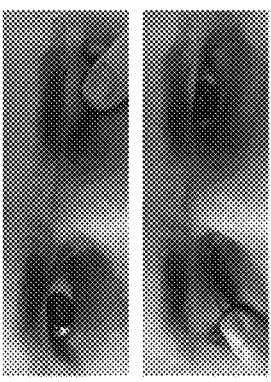
Figure 7:
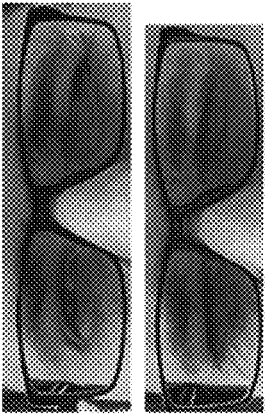

The provided systems, methods and programs are adapted, when implemented, to provide an estimate of the user's dominant eye by analysis of the user's face and eye images. Therefore, the user does not have to recalibrate the system, or adjust camera position after the system is turned on. It allows the user to drastically change his position with respect to the camera, or alter the environmental settings (e.g., illumination, eyewear, etc. (see e.g., FIG. 7A illustrating illumination differences between two glasses lenses)).

The provided systems, methods and programs are adapted, when implemented, to provide an optimal combination differentiating the dominance between the user's eyes solely based on the image of the face and eyes. Therefore, the gaze estimation system does not have to use heuristics to determine the quality of the image, and in certain exemplary implementations, operate successfully when only a single eye is operational or visible to the camera (see e.g., FIGS. 7B, 7C, 7D). The disclosed systems, methods, and programs (e.g., processor-readable media) can be extremely beneficial for the user experience in both mid-range (laptop, mobile-device) and long-range (TV display, billboard) use cases. The continuous and automatic determination of the user's dominant eye is an advantage in systems that require gaze-based rendering or eye-control. Moreover, the disclosed and claimed technology is not only limited to mid-range or long-range settings, but can also be adapted to provide a solution when only the eyes of the user are captured from short-range, such as with a "head-mounted display" (HMD), smartphone, or smart glasses.

The term "mid-range" refers to cases when the reference camera is situated between 30-80 cm from the user's eyes. The term "long-range" refers to cases when the reference camera is situated between 100-300 cm from the user's eyes. In both cases, there is usually a digital display that projects content which is consumed (e.g., viewed) by the user and can be touchlessly manipulated by him/her/them, using, e.g., eye gestures (e.g., fixation, blinks, winks etc.). In some cases, the digital display may project a 3D image.

In general, gaze estimation methods can be categorized as either model/feature-based or appearance-based. Model/Feature-based methods extract eye features such as low-level human generated feature detectors e.g., eye contour, eye-corners, pupil radius, pupil center and corneal reflections (referred to as glint(s)). Most existing methods require active light sources outside of the human vision spectrum (e.g., Infrared (IR)), and can achieve relatively high accuracy. However, accurate and robust feature extraction requires specialized equipment such as infrared (IR) light source(s) to provide a strong contrast and high image quality to enable the extraction of these features. In many cases, this is not achievable due to user's position with respect to the active light-source or camera, refraction from glasses or other surfaces, and/or large distance (see e.g., FIG. 7D). These approaches implicitly estimate the relevant gaze features, such as eye geometric features and intrinsic camera calibration parameters in a one-time personal calibration process. These features and parameters are highly affected by eye visibility and image quality, and often produce bad results in cases of visual obstruction or low feature quality.

Provided herein, in an exemplary implementation, is a continuous and versatile process to assess and determine in real-time, for each user visible to the camera, the user's dominant eye, or their combination, to be used for POR prediction. It does not require any special devices beyond basic imaging hardware, nor human crafted low-level features (e.g., glint-detection). The programming disclosed herein is trained, in an unsupervised manner, to select the optimal eye combination/selection under real world conditions that optimizes accuracy and precision in POR mapping. This includes the implicit (reflected in the data—collected under real-world conditions) consideration of limited features detection caused by poor image quality and resolution, variance of lighting conditions, suboptimal head poses, and user variability in terms of internal eye structure (e.g., leading or preferred eye).

Given an unlabeled image of the user's face and eyes, the systems, methods, and programs provided herein perform a weighted selection of dominance between each of the user's eyes, and processes this information into a full point-of-regard prediction for every frame captured by an imaging device, e.g., a digital camera. This allows, among other applications, applying model-based algorithms or appearance-based methods for accurate remote gaze prediction, eye state (e.g., open, closed, or intermediate) detection, etc. The unsupervised approach is built upon the constraints of minimization of gaze error, which is implemented through a loss function, optimized through a training process using backpropagation algorithms (e.g., stochastic gradient descent). Furthermore, the system can be trained based solely on images of eye(s) without exhaustive human labeling of image quality assessment or heuristic intervention. The systems methods and programs provided allow dominant eye-selection to be determined in an unsupervised manner, thus relaxing a demand for exhaustively large, consistently and thoroughly labeled datasets, which can be quite expensive and at times impossible to validate (without explicit information about any eye disorders that the user may have). When fed into the appropriate regression algorithm, these features allow for a more accurate remote gaze estimation.

While there is abundant literature about user gaze estimation, there is little if any research about end-to-end embedding of known physiological and physical deficiencies using data driven methods (when the ophthalmological deficiency is not known, but rather inferred from the data itself). While most known methods use either heuristic methods (e.g., threshold based) to define the quality of images used in gaze inference, other methods use a pre-defined set of rules to choose if the data is qualified (in other words, does the data lend itself to extraction of the necessary features to determine the feature sought) for gaze inference (e.g., blink detection, occlusion, and the like). Conversely, provided herein is a framework that implicitly determines the relation between the eyes (in other words, the dominance determination) when it comes to gaze inference (in other words, in determining POR), including salient features (e.g., ocular dominance) that are not visible within a digital frame and cannot be externally labeled by a human.

The concept of a data driven 'selector' can be extended beyond the Gaze Inference task. This technique allows for an end-to-end training of a 'selector' module with domain-expertise knowledge embedded in the network training process. The 'selection' is performed implicitly, through an unsupervised training process (e.g., the data is not labeled to perform any selection, and it not aware of this process) that optimizes the final objective function, given through the loss function, which can be altered by the system as a function of the task at hand.

Figure 1:
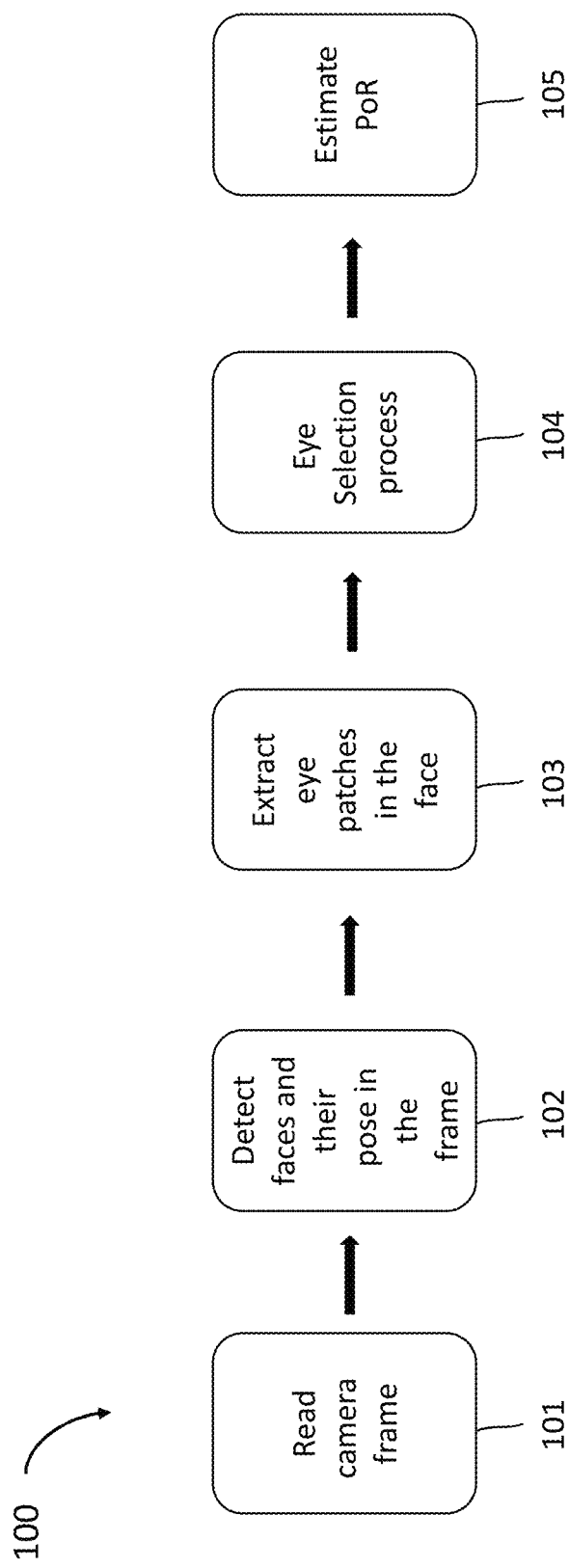
FIG. 1 shows a flow chart of general inference flow for eye selection by an eye-selector for gaze estimation.
Figure 2:
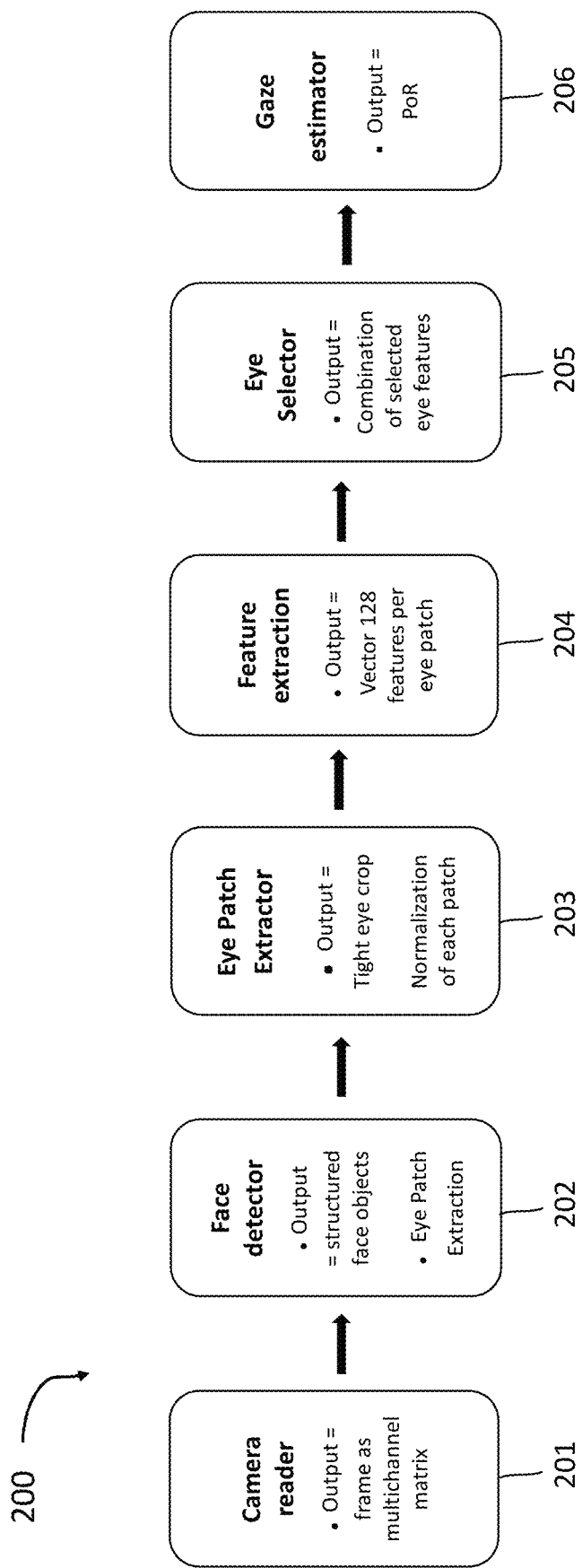
FIG. 2 is a detailed inference flow, describing the flow from digital image to POR including outputs at each operation.
Figure 3:
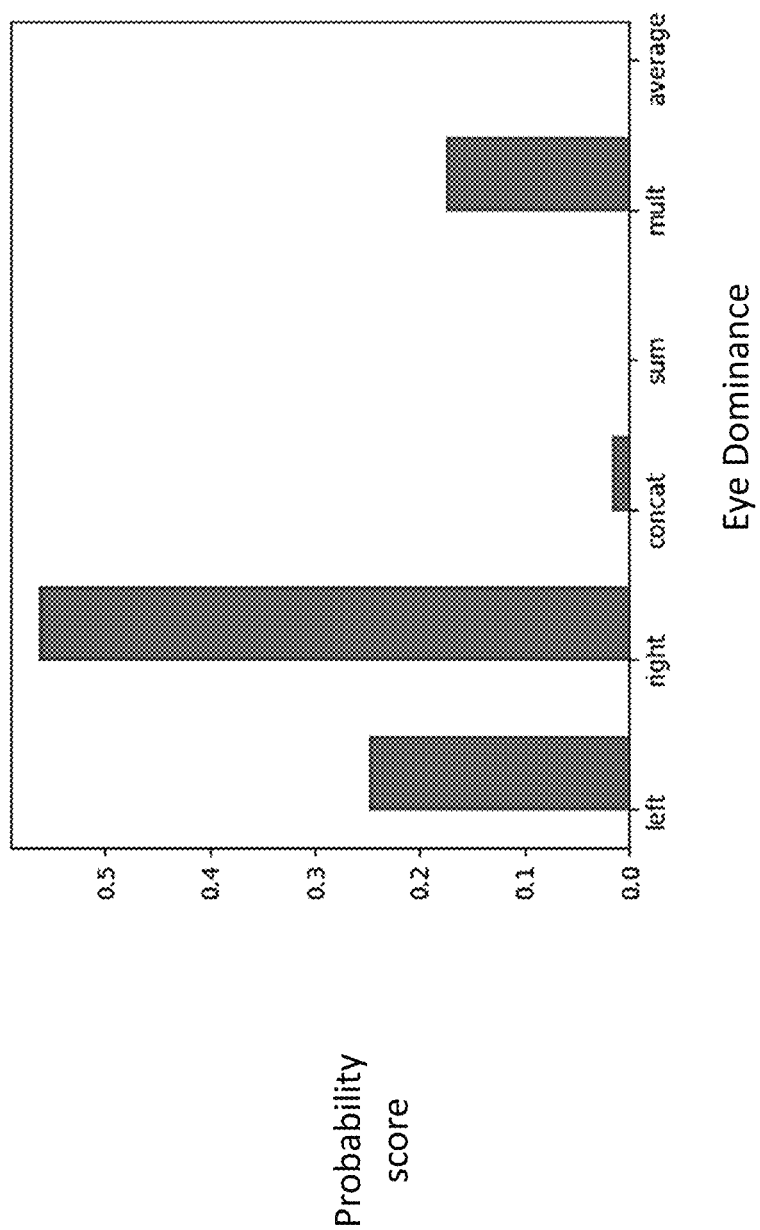
FIG. 3 is a chart of an example eye-selector probability distribution.

Accordingly and in an exemplary implementation illustrated e.g., in FIGS. 1-2, provided herein is a computerized deep-learning method of establishing the user's dominant eye (see e.g., FIG. 2), implementable in a system comprising an imaging module facing the user, a central processing module in communication with an operator interface module, face and eye detection modules, eye-patch normalization unit, rendering module, and a display used for user interaction and/or activation, the method comprising: using a digital-camera to capture single or multiple images of the user's eye; for each image, an extraction of the user's head and both eyes is performed; An imaging database is used to train the system prior to inference flow, the method comprising: capturing a user fixation labeled image comprising the eye region (point of regard training data may be labeled); for each image, the (X,Y) coordinate of the user fixation on the screen is known and used as the ground-truth for the training phase, however the eye dominance is not yet available, and is being obtained in an unsupervised manner wherein a plurality of convolutional filters is used on the unlabeled image comprising the eye region to recover the eye dominance probability for every frame independently.

FIG. 1 shows a schematic of the general system architecture. As shown, using the imaging module, the face detection module, and the eye region cropping module (see e.g., FIG. 2), an unlabeled image dataset can be captured and used as input into a convolutional neural network for training, then the trained system is used for dominant eye estimation.

In the method provided, identifying the 'dominant eye' can comprise: training at least one 'Vanilla' Convolutional-Neural-Network (CNN) based on a set of eye images; using at least one of the imaging module, the face detection module, or the eye region cropping module to identify an image of the eye for use in the CNN; and for each of the eye images, extracting spatial features corresponding to each eye separately. The CNN can be any type or form of convolutional network, with numbers of layers (e.g., between 10-30) depending on the image resolution and number of channels. This 'Vanilla' model may produce a predetermined number of features (between 64-512) from the captured image data via a training process, with standard optimization techniques (e.g. stochastic gradient descent). For example, the term "Vanilla" may refer to a CNN with an architecture shown in FIGS. 4 and 5).

Figure 4:
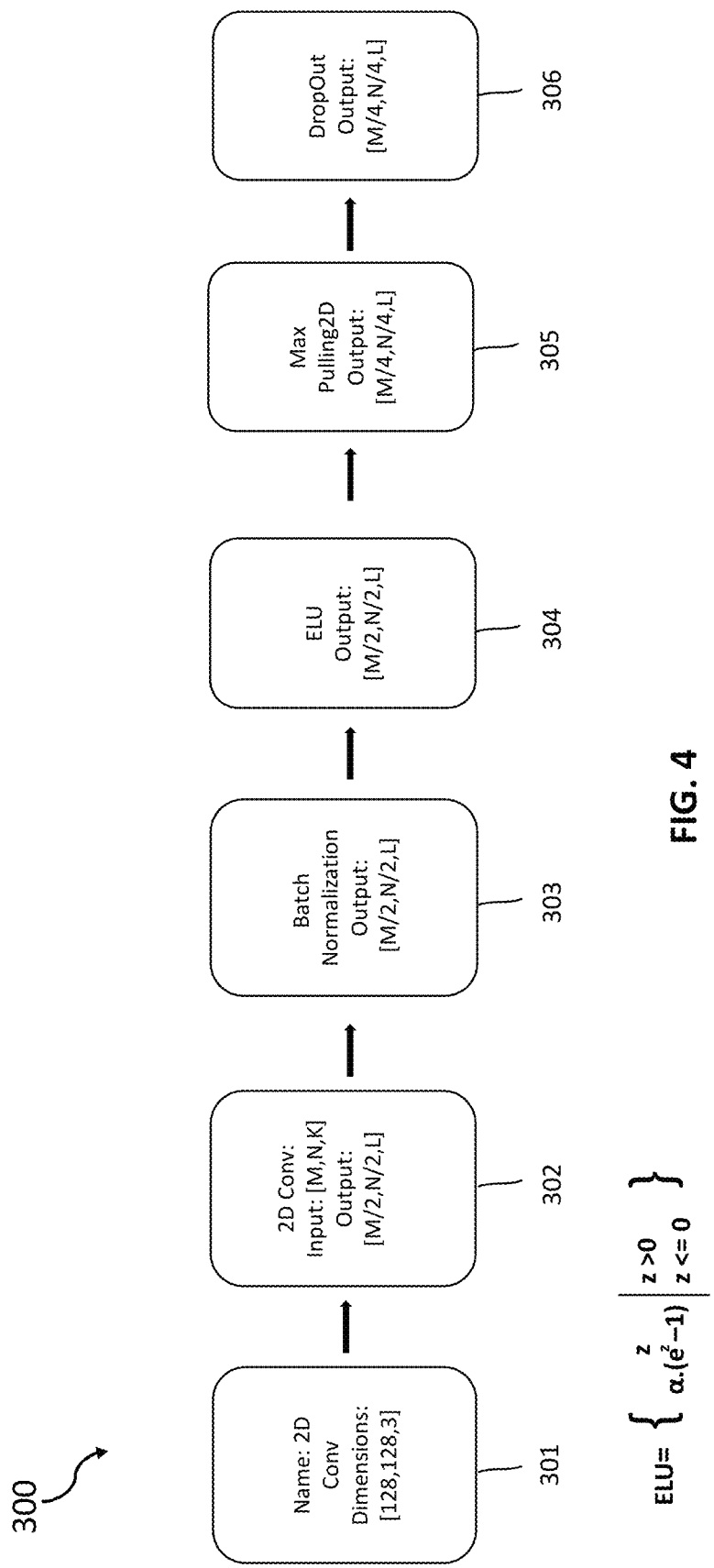
FIG. 4 shows a Vanilla network micro-block.
Figure 5:
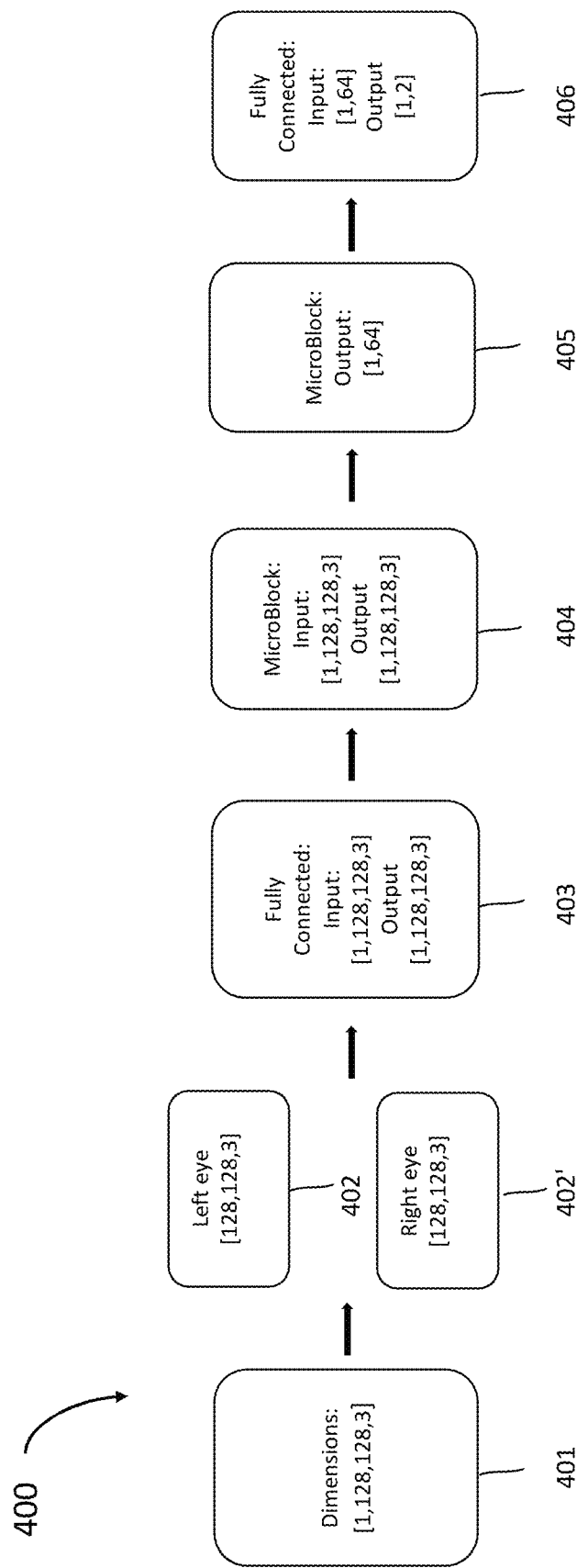
FIG. 5 shows Vanilla network Architecture.
Figure 6:
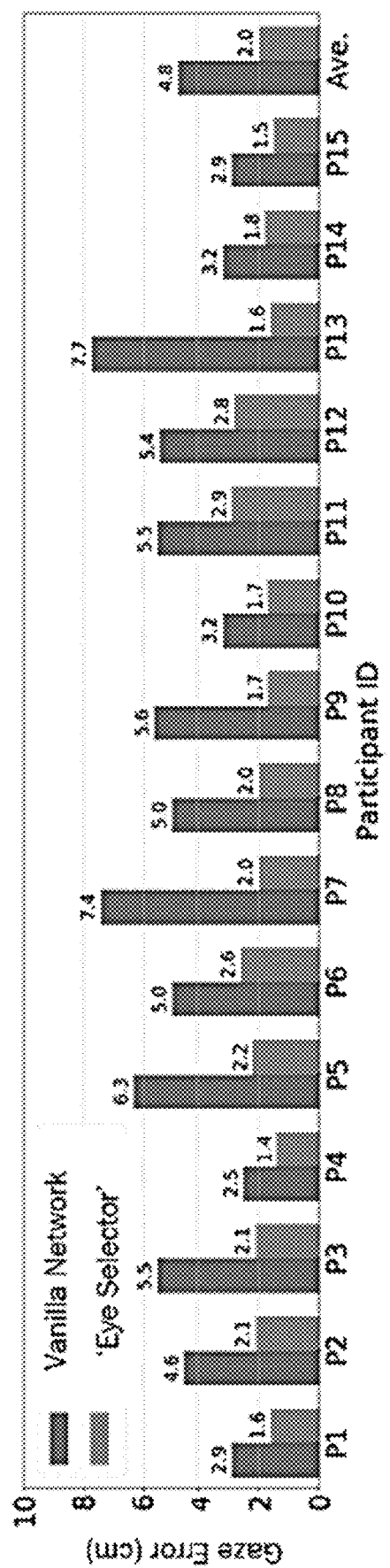
FIG. 6 is a graph illustrating a comparison of gaze error results from a baseline Vanilla Network method and results from gaze estimation using a deep-learning scheme as described herein.

An example is illustrated in FIG. 6, where a baseline gaze estimation method is provided using a first Vanilla network (see details in FIGS. 4 and 5). This baseline takes both eye-patches, each eye-patch covering between about 128×128 and about 512×512 pixels as input and outputs of the (X, Y) PoR on the screen in cm/pixels. In an exemplary implementation, an ADAM optimizer was used with an initial learning rate of 0.0001-0.0005, and the images batch size was set to be 50. The baseline model was trained for 25 epochs and decay of the learning rate was set to a factor of 0.1-0.3 every 10-30 epochs.

The following is an exemplary algorithm for dataset preparation for training:
1. Obtain M images that include a human face and two (left/right) eyes and their corresponding fixations (X, Y) on the screen, collected through standard image-based stimuli:
    a. Detection of face and eyes in the image (e.g., a bounding box for the eyes and face).
    b. Filter out images that do not have visible eyes in the frame:
        i. Remove images where an eye blink is detected;
        ii. Remove images that do not have a sufficient minimum number of pixels (1.5-3.0 pixels-per-millimeter is a good range);
    c. Find the eye center and create an eye crop width;
    d. Generate eye patches within the range of 96×48, 192×96, or 384×192, according to the camera resolution and field-of-view;
    e. Output the eye patches as a clean dataset that will be used for unsupervised training (M_DATA_CLEAN);
2. Generate A TRAIN/VALIDATION/TEST set with 60%, 20% and 10% proportions respectively;
    a. The ground-truth is the (X, Y) location in mm or cm in the camera's coordinate system;
    b. The labeling for eye dominance is separately generated only for the purpose of testing and includes: closed eyes, blurred eyes, heavily degraded images, and samples of participants of known eye disorders that may impact eye dominance probability.

The following is an exemplary algorithm for Unsupervised Eye Selector Training:
1. For Each image in M_DATA_CLEAN
    a. For each set of images in (size of batch: between 50-150 image pairs):
    b. For number of EP(=150-250) epochs:
        i. For each Batch 1. For each left and right image, train convolutional-neural-network (CNN) followed by the 'selector unit'
   a. CNN Network:
   i. 8-12 CNN 'micro-layers' of the following sequential form:
   1. 2D-Convolution.
   2. Batch-Normalization.
   3. Exponential Linear Unit: ELU(x)={x if x>0 else α(exp(x)−1)}.
   4. Dropout.
   ii. The output of (i) is a 128-256 sized feature vector.
   b. Define 'Parametric Transform Block':
   i. Batch-Normalization.
   ii. Activation Function (e.g. ReLu, Sigmoid, Tanh, etc.).
   iii. Dropout layer.
   iv. Dense Layer (fully connected NN).
   c. 'Selector Unit' ( )
   d. Calculation of total loss function on the output of the 'Selector Unit'—$L_{SU}$ (e.g., Mean-Square-Loss, Huber function etc.).
2. Update network weights using backpropagation optimization (e.g. ADAM, SGD etc.).

It is noted that the term "imaging module" as used herein may include a head mounted device unit that includes a plurality of built-in image and/or optical sensors, and that can output electrical signals, which have been obtained through photoelectric conversion, as an image, while the term "module" refers to software, hardware, for example, a processor, or a combination thereof that is programmed with instructions for carrying out an algorithm or method. The modules described herein may communicate through a wired connection, for example, a hard-wired connection, a local area network, or the modules may communicate wirelessly. The imaging module may comprise charge coupled devices (CCDs), a complimentary metal-oxide semiconductor (CMOS), or a combination comprising one or more of the foregoing. If static images are required, the imaging module can comprise a digital frame camera, where the field of view (FOV) can be predetermined by, for example, the camera size and the distance from the subject's face. The cameras used in the imaging modules of the systems and methods disclosed, can be a digital camera. The term "digital camera" refers in an exemplary implementation to a digital still camera, a digital video recorder that can also capture a still image of an object, and the like. A digital camera can comprise an image capturing unit or module, a capture controlling module, a processing unit (which can be the same or separate from the central processing module).

Capturing an image can be done with, for example, image capturing means such as a CCD solid image capturing device of the full-frame transfer type, and/or a CMOS-type solid image capturing device, or their combination. Furthermore, and in another exemplary implementation, an imaging module can have a single optical (e.g., passive) sensor having known distortion and intrinsic properties, obtained for example, through a process of calibration. These distortion and intrinsic properties are, for example, a modulation-transfer function (MTF), pinhole camera model attributes such as: principal point location, focal-length for both axes, pixel-size and pixel fill factor (the fraction of the optical sensor's pixel area that collects light that can be converted to current), lens distortion coefficients (e.g., pincushion distortion, barrel distortion), sensor distortion (e.g., pixel-to-pixel on the chip), anisotropic modulation transfer functions, space-variant impulse response(s) due to discrete sensor elements and insufficient optical low-pass filtering, horizontal line jitter and scaling factors due to mismatch of sensor-shift and analog-to-digital-conversion-clock (e.g., digitizer sampling), noise, and their combination. In an exemplary implementation, determining these distortion and intrinsic properties is used to establish an accurate sensor model, which can be used for implementation of a calibration algorithm.

To facilitate some operations of the methods and programs described, the system can further comprise a graphic processing module (GPM), in communication with the central processing module and the processor. It should be understood though, that the graphics processing module may or may not be a separate integrated circuit.

The systems used herein is a computerized system; further comprising a central processing module (CPM); a display module; and a user interface module. The display module may include display elements, which may include any type of element which acts as a display. A typical example is a Liquid Crystal Display (LCD). An LCD, for example, may include a transparent electrode plate arranged on each side of a liquid crystal. There are, however, many other forms of displays, for example OLED displays, and bi-stable displays. New display technologies are also being developed constantly. Therefore, the term display should be interpreted widely and should not be associated with a single display technology. Also, the display module may be mounted on a printed circuit board (PCB) of an electronic device, arranged within a protective housing, and the display module protected from damage by a glass or plastic plate arranged over the display element and attached to the housing.

Additionally, "user interface module" broadly refers to any visual, graphical, tactile, audible, sensory, or other means of providing information to and/or receiving information from a user or other entity. For example, a set of instructions which enable presenting a graphical user interface (GUI) on a display module to a user for displaying and changing and or inputting data associated with a data object in data fields. In an exemplary implementation, the user interface module can display any data that it reads from the imaging module.

As indicated, the systems implementing the methods provided, using the programs provided can further comprise a central processing module; a display module; an edge detection module, and a user interface module. The term 'module', as used herein, means, but is not limited to, a software or hardware component, such as a Field Programmable Gate-Array (FPGA) or Application-Specific Integrated Circuit (ASIC), which performs certain tasks. A module may advantageously be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

As indicated, provided herein is a computer program, comprising program code means for carrying out the steps of the methods described herein, as well as a computer program product (e.g., a micro-controller) comprising program code means stored on a non-transitory medium that can be read by a computer, such as a hard disk, CD-ROM, DVD, USB memory stick, or a storage medium that can be accessed via a data network, such as the Internet or Intranet, when the computer program product is loaded in the main memory of a computer or micro-controller and is carried out by the computer or micro controller.

Furthermore, provided herein is a non-transitory computer-readable medium comprising the executable instructions disclosed. Accordingly, provided herein is processor-readable media implementable in the computerized systems described herein, whereby the central processing module further comprising a non-volatile memory having thereon the non-transitory processor readable media with a set of instructions configured, when executed to cause the central processing module to: use a user-facing digital camera to capture a plurality of images of the user's face and eye(s); calculate a set of features for each image, per eye, using standard convolutional layers (e.g., a Vanilla Convolutional Neural Network), which is subsequently processed by an 'eye selector' module, providing the dominant eye soft-selection (in the form of a probability term per each eye combination). The probability is typically expressed as a number between 0 and 1, where a probability of 0 means that the eye is not dominant at all, and a probability of 1 indicates a fully dominant eye.

The eye selector program or module of the instant application evaluates critical eye features such as iris, sclera, pupil, and limbus imaging; any large gaps in illumination between the left and right eye patches; any asymmetry between the eye patches with respect to PoR relative to a focal point on a display; or any abnormal reflections that do not correspond to typical eye texture.

The following is an exemplary algorithm for the eye selector module:

'Selector Unit' or 'Selector Module'
1. Input: Left/Right Eye Input features from CNN Network: [1, 32-256].
2. Eye Combinations Block (ECB):
   a. LeftEye [32-256]
   b. RightEye [32-256]
   c. Sum [32-256]
   d. Average [32-256]
   e. FullyConnectedLayer(Concatenation[32-256]),
   f. min-elementwise [32-256]
   g. max-elementwise [32-256]
   h. multiplication [32-256]
3. Output: vector of size [1, 32-256]
4. Parametric Transform Block applied on a-h
5. Tube Element: Dense Layer of shared weights:
   a. Input 8×(1,32-256).
   b. Output: 8×(1,32-256).
6. Norm calculation of each element (e.g., L2, L1 etc.):
   a. Input: adding this Norm value to a new vector 8×(1,32-256).
   b. Output: (8,1)—NormVector.
7. SoftMax on the NormVector—Now we have a probability.
8. Multiplication of Combinations:
   a. Input: [8, 32-256]×[8,1] (selection).
   b. Output: Soft Selection Probabilities: [8, 32-256]
9. Summation element wise of (8):
   a. Input: [8, 32-256]
   b. Output: [1, 32-256]
10. Apply Parametric transform.—Regressor.

The term "computer-readable medium" as used herein, in addition to having its ordinary meaning, refers to any non-transitory medium that participates in providing instructions to a processor for execution. Such a medium may take many forms, including but not limited to, non-volatile media and volatile media. Non-volatile media can be, for example, optical or magnetic disks, such as a storage device. Volatile media includes dynamic memory, such as main memory.

Memory device as used in the methods, programs and systems described herein can be any of various types of memory devices or storage devices. The term "memory device" is intended to encompass an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, optical storage, or ROM, EPROM, FLASH, etc. The memory device may comprise other types of memory as well, or combinations thereof. In addition, the memory medium may be located in a first computer in which the programs are executed (e.g., a training computer), and/or may be located in a second different computer or micro controller which connects to the first computer over a network, such as the Internet and might be even not connected and information will be transferred using a USB drive. In the latter instance, the second computer may further provide program instructions to the first computer for execution.

Unless specifically stated otherwise, as apparent from the discussions, it is appreciated that throughout the specification discussions utilizing terms such as "processing," "loading," "in communication," "transferring", "receiving", "sending", "detecting," "calculating," "determining", "analyzing," or the like, refer to the action and/or processes of a computer or computing system, or similar electronic computing device, that manipulate and/or transform data represented as physical signals, such as a transistor architecture into other data similarly represented as physical and structural layers.

Note that if the processor, module, servers, network switches etc., processing circuit, and/or processing unit includes more than one processing device, the processing devices may be centrally located or may be distributed (e.g., cloud computing via indirect coupling via a local area network and/or a wide area network). Still further it is noted that the memory element may store, and the processor, module, processing circuit, and/or processing unit may execute hard coded and/or operational instructions corresponding to at least some of the steps, operations, and/or functions illustrated in one or more of FIGS. 1, 2, 4 and 5. Such a memory device, memory element, or processor element can be and is included in an embodiment as an article of manufacture.

The term "memory device" can also include two or more memory devices which may reside in different locations, e.g., in different computers that are connected over a network.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having," and their derivatives.

The terms "a", "an", and "the" herein do not denote a limitation of quantity and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the stack(s) includes one or more stacks). Reference throughout the specification to "one exemplary implementation", "another exemplary implementation", "an exemplary implementation", and so forth, when present, means that a particular element (e.g., feature, structure, and/or characteristic) described in connection with the exemplary implementation is included in at least one exemplary implementation described herein, and may or may not be present in other exemplary implementations. In addition, it is to be understood that the described elements may be combined in any suitable manner in the various exemplary implementations.

In the context of the disclosure, the term "operable" means the system and/or the device and/or the program, or a certain element or step is fully functional, sized, adapted, calibrated, comprises elements for, and meets applicable operability requirements to perform a recited function when activated, coupled, implemented, actuated, effected, realized, or when an executable program is executed by at least one processor associated with the system and/or the device. In relation to systems and circuits, the term "operable" means the system and/or the circuit is fully functional and calibrated, comprises logic for, having the hardware and firmware necessary, as well as the circuitry for, and meets applicable operability requirements to perform a recited function when executed by at least one processor.

Although the foregoing disclosure for systems, methods, and programs for determining a dominant eye of a user has been described in terms of some exemplary implementations, other exemplary implementations will be apparent to those of ordinary skill in the art from the disclosure herein. Moreover, the described exemplary implementations have been presented by way of example only and are not intended to limit the scope of the exemplary implementations. Indeed, the novel methods, programs, and systems described herein may be embodied in a variety of other forms without departing from the spirit thereof. Accordingly, other combinations, omissions, substitutions, and modifications will be apparent to the skilled artisan in view of the disclosure herein.

While the invention has been described in detail and with reference to specific exemplary implementations thereof, it will be apparent to one of ordinary skill in the art that various changes and modifications can be made therein without departing from the spirit and scope thereof. Accordingly, it is intended that the present disclosure covers the modifications and variations of this invention provided they come within the scope of the appended claims and their equivalents.

Clauses:

1. A computerized method for determining a dominant eye of a user, implemented in a system comprising: in imaging module, an eye selector module, a display, and a central processing module, the central processing module in communication with the eye-selector module, the imaging module, and the display, and in further communication with at least one processor and a non-volatile memory storage device storing thereon a processor-readable medium with a set of executable instruction, configured, when executed to cause the processor to operate the imaging module, and the display, the method comprising:
   a. using the imaging module, obtaining at least one unlabeled image of the user;
   b. isolating a frame from the unlabeled image;
   c. detecting at least one of: a face, and a head pose;
   d. extracting a portion of the frame comprising both eyes of the user, thereby extracting an eyes' patch;
   e. using the eye-selector module, determining the user's dominant eye.

2. The method of clause 1, further comprising, using the determined dominant eye, determining the user's point-of-regard (POR).

3. The method of clause 2, wherein the imaging module is operable to capture the user's face when observing the display.

4. The method of clause 3, wherein the step of determining the user's POR comprises determining the POR on the display.

5. The method of clause 4, wherein the distance between the user and the display is between about 30 cm and about 300 cm.

6. The method of clause 1, wherein the step of determining the user's dominant eye is performed using unsupervised machine learning of a plurality of unlabeled images of the eye portions in the image.

7. The method of clause 6, wherein the step of obtaining at least one image of the user, is preceded by a step of, using the display, displaying a fixation point on the display, having predetermined coordinates, the method further comprising:
   a. applying a plurality of convolutional filters for each portion of the frame comprising both eyes of the user;
   b. based on the applied convolutional filters, recovering the eye dominance probability; and
   c. based on the recovered probability for each eye, determining the user's eye dominance.

8. The method of clause 7, wherein the system further comprises: an operator interface module, a face and eye detection modules, an eyes'-patch normalization unit, and a rendering module.

9. The method of clause 8, wherein the step of extracting a portion of the frame comprising both eyes of the user, comprises using the eyes' patch normalization module, cropping the frame to isolate the eyes' patch; and inputting the isolated eyes'-patch to a convolutional neural network (CNN).

10. The method of clause 9, wherein the step of recovering the eye dominance probability, comprises:
   a. training at least a first Convolutional-Neural-Network (CNN) based on a training set comprising a plurality of eyes'-patch images;
   b. using at least one of: the imaging module, the face detection module, and the eye region cropping module, identifying an image of the eye for the CNN; and
   c. for each of the eye images, extracting a spatial-features corresponding to each eye separately.

11. A computer readable medium (CRM) comprising software instructions for determining a dominant eye of a user, the instructions being operable, when executed to cause at least one processor included with a computerized system to execute the steps of:
   a. using an imaging module included with the computerized system, obtaining at least one unlabeled image of the user;
   b. isolating a frame from the unlabeled image;
   c. detecting at least one of: a face, and a head pose;
   d. extracting a portion of the frame comprising both eyes of the user, thereby extracting an eyes' patch;
   e. using an eye-selector module included with the computerized system, determining the user's dominant eye.

12. The CRM of clause 11, wherein the instructions are further operable, when executed, to cause the at least one processor to execute the steps of: using the determined dominant eye, determining the user's point-of-regard (POR).

13. The CRM of clause wherein the imaging module is operable to capture the user's face when observing a display included with the computerized system.

14. The method of clause 13, wherein, in the step of determining the user's POR, the instructions are further operable, when executed, to cause the at least one processor to execute the step of determining the POR on the display.

15. The method of clause 14, wherein the distance between the user and the display is between about 30 cm and about 300 cm.

16. The method of clause 11, wherein the step of determining the user's dominant eye is performed using unsupervised machine learning of a plurality of unlabeled images of the eye portions in the image.

17. The method of clause 16, wherein, prior to the step of obtaining at least one image of the user, the instructions are further operable, when executed, to cause the at least one processor to execute the steps of
   a. using the display, displaying a fixation point on the display, having predetermined coordinates:
   b. applying a plurality of convolutional filters for eyes' patch;
   c. based on the applied convolutional filters, recovering the eye dominance probability; and
   d. based on the recovered probability for each eye, determining the user's eye dominance.

18. The method of clause 17, wherein, in the step of extracting a portion of the frame comprising both eyes of the user, the instructions are further operable, when executed, to cause the at least one processor to execute the steps of:
   a. using an eyes' patch normalization module included with the computerized system, cropping the frame to isolate the eyes' patch; and
   b. inputting the isolated eyes'-patch to a convolutional neural network (CNN).

19. The method of clause 18, wherein, in the step of recovering the eye dominance probability, the instructions are further operable, when executed, to cause the at least one processor to execute the steps of:
   a. training at least a first Convolutional-Neural-Network (CNN) based on a training set comprising a plurality of eyes'-patch images;
   b. using at least one of: the imaging module, a face detection module included with the computerized system, and an eye region cropping module included with the computerized system, identifying an image of the eye for the CNN; and
   c. for each of the eye images, extracting a spatial-features corresponding to each eye separately.

We claim:

1. A method for determining at least one dominant eye of a user for the task of gaze estimation, the method comprising:
   1) obtaining at least one frame of a digital image of a user;
   2) detecting at least one of a face, an eye region, or a head pose within the at least one frame using at least one first convolutional neural network applied to at least one data matrix; and
   3) determining the user's dominant eye based on an extracted portion of the at least one of a face, an eye region, or a head pose, wherein the extracted portion includes left and right eye patches of the digital image of the user;
   and wherein the user's dominant eye is determined by applying at least one second convolutional neural network to the left and right eye patches of the digital image of the user.

2. The method of claim 1 wherein the digital image of a user is obtained from at least one of a camera, an imaging module, an image processor, a memory, or other image capture device.

3. The method of claim 1 wherein the at least one data matrix comprises at least one of an intensity image or a pixel array.

4. The method of claim 1 wherein the at least one convolutional neural network is trained on unlabeled data in an unsupervised manner.

5. The method of claim 1 wherein the applying at least one second convolutional neural network to the left and right eye patches of the digital image of the user results in at least one dominant eye probability for each eye.

6. The method of claim 5 wherein the at least one dominant eye probability is within a range of 0-1 per eye.

7. The method of claim 1 wherein the dominant eye determination is used to inform at least one of point of regard determination, gaze estimation, gaze tracking, attention determination, object of interest determination, amblyopia detection, or visual acuity estimation.

8. The method of claim 1, wherein the obtaining at least one frame of a digital image of a user comprises:
   obtaining at least one frame of a digital image of a user via a camera positioned from about 30 cm to about 300 cm from the face of the user.

9. A non-transitory computer readable medium comprising instructions which, when the program is executed by a computer, cause the computer to carry out the operations of claim 1.

10. A system for determining at least one dominant eye of a user for the task of gaze estimation, the system comprising:
   1) an imaging device for obtaining at least one frame of a digital image of a user;
   2) a processor configured to detect at least one of a face, an eye region, or a head pose within the at least one frame using at least one first convolutional neural network applied to at least one data matrix; and
   3) a processor configured to determine the user's dominant eye based on an extracted portion of the at least one of a face, an eye region, or a head pose, wherein the extracted portion includes left and right eye patches of the digital image of the user;
   and wherein the processor configured to determine the user's dominant eye is further configured to apply at least one second convolutional neural network to the left and right eye patches of the digital image of the user.

11. The system of claim 10, wherein the imaging device for obtaining at least one frame of a digital image of a user comprises: a camera operable to capture image frames of the face of the user.

12. The system of claim 11, wherein the camera is operable to output at least one image frame as a multichannel matrix.

13. The system of claim 12, wherein the multichannel matrix comprises at least one of an intensity image or a pixel array.

14. The system of claim 10, wherein the extracted portion comprises at least one of a tight eye-crop or a normalization of eye patches for each eye.

15. The system of claim 10, wherein the extracted portion comprises a vector of at least 128 features per eye patch.

16. The system of claim 10, wherein the processor configured to determine the user's dominant eye further comprises a point of regard estimator having an average gaze error of less than 3.0 cm.

\* \* \* \* \*